H. F. SNYDER.
CONVEYER FOR BAND CUTTERS AND FEEDERS.
APPLICATION FILED JULY 11, 1910.
1,092,181.
Patented Apr. 7, 1914.
2 SHEETS—SHEET 1.
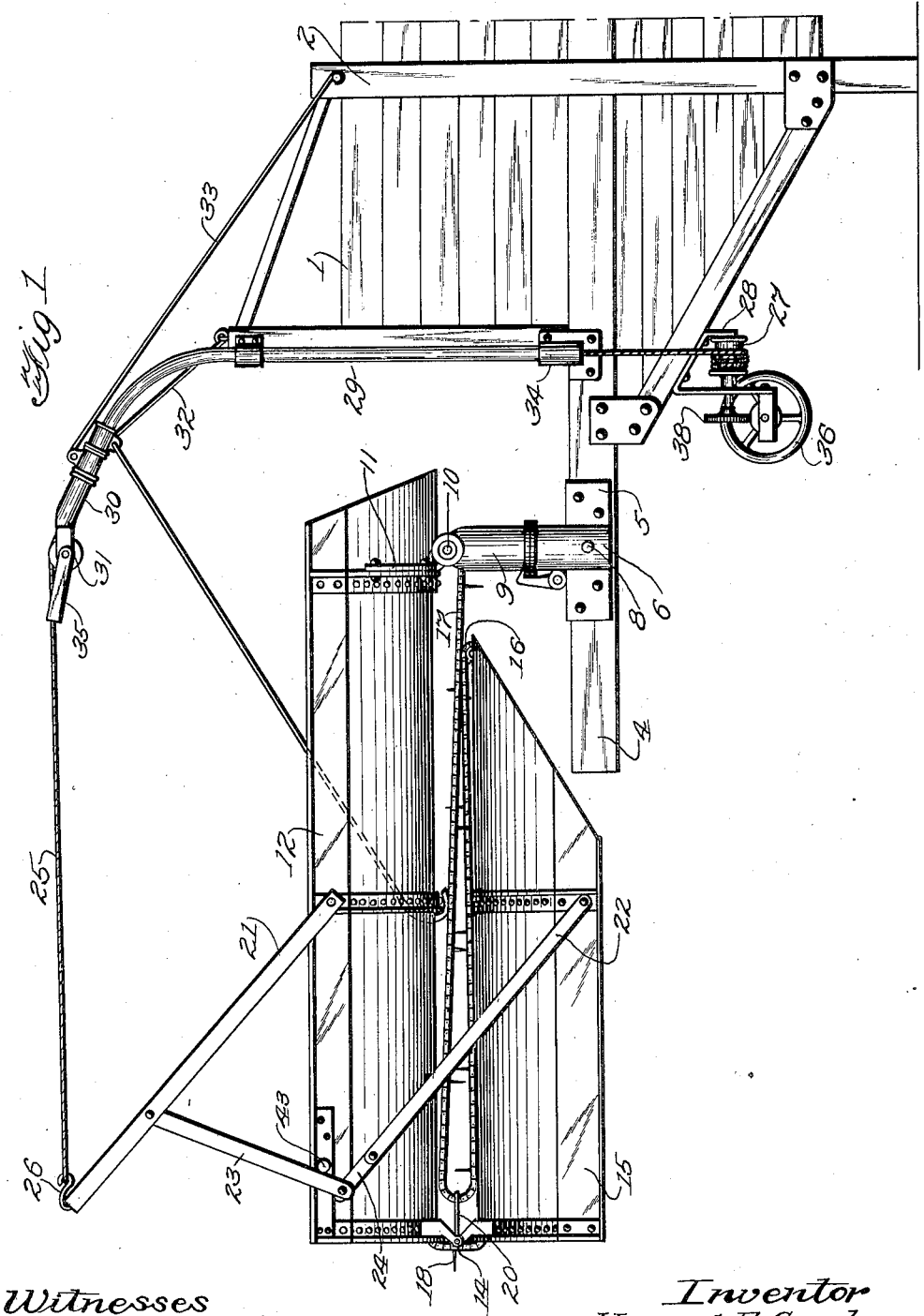
Witnesses
F. C. Caswell
George Mankle
Inventor
Howard F. Snyder.
by Wallace R. Lane Atty.

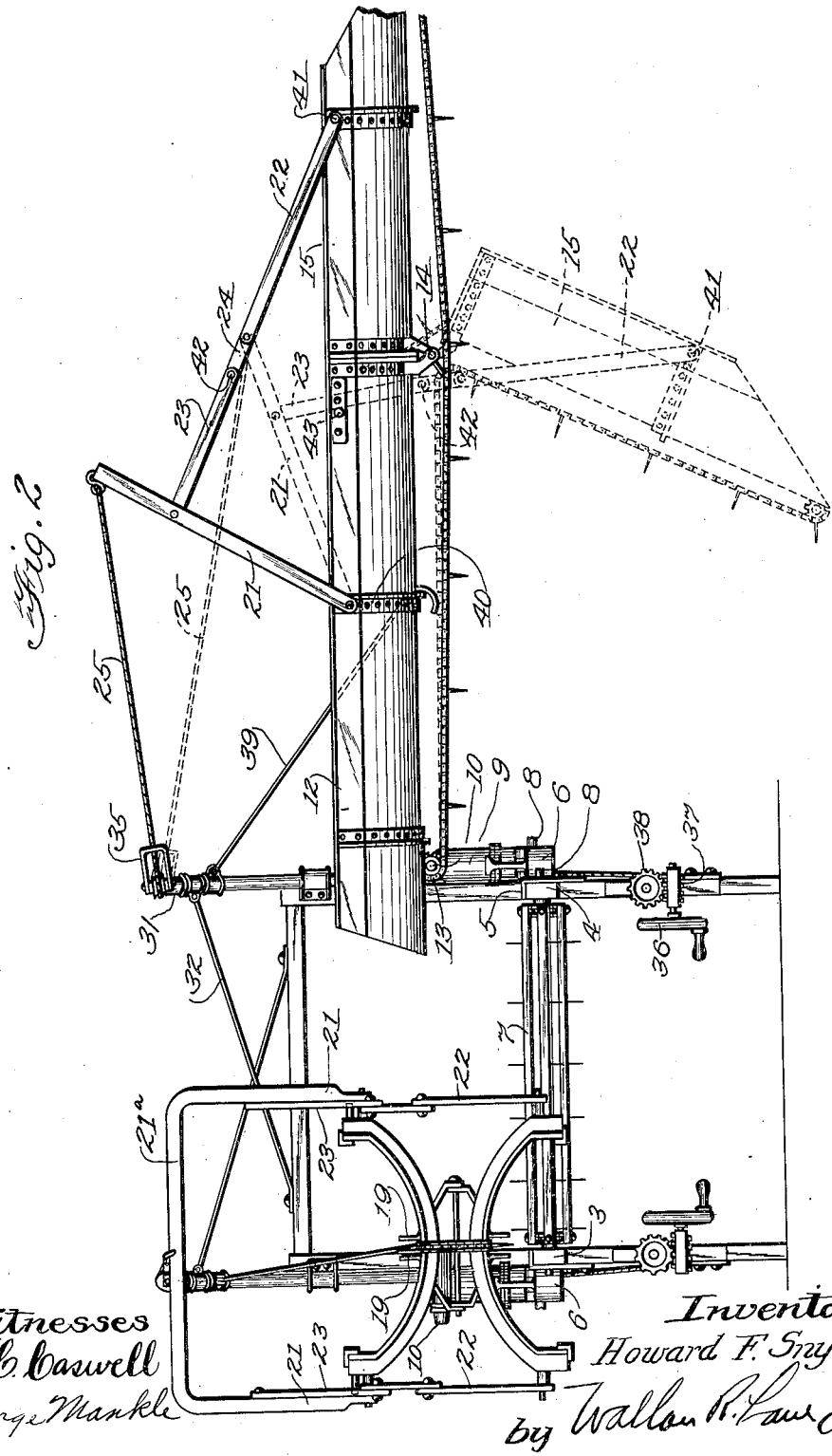

UNITED STATES PATENT OFFICE.

HOWARD F. SNYDER, OF NEWTON, IOWA, ASSIGNOR TO THE MAYTAG COMPANY, OF NEWTON, IOWA, A CORPORATION.

CONVEYER FOR BAND-CUTTERS AND FEEDERS.

1,092,181. Specification of Letters Patent. Patented Apr. 7, 1914.

Application filed July 11, 1910. Serial No. 571,273.

*To all whom it may concern:*

Be it known that I, HOWARD F. SNYDER, a citizen of the United States, residing at Newton, in the county of Jasper and State of Iowa, have invented a certain new and useful Conveyer for Band-Cutters and Feeders, of which the following is a specification.

My invention relates to conveyers which are especially adapted to be used in connection with band cutters and feeders, but which may obviously be used in other connections.

The principal object of my invention is to provide a conveyer which consists of sections adapted to be folded when the conveyer is not in use.

In conveyers heretofore constructed for use on threshing machines and the like, it was necessary when the conveyer was not in operation to detach the conveyer from the supporting frame, and swing it around to the side of the threshing machine. These carriers were of course constructed of one piece and it required considerable work and time to thus bodily move the entire carrier from its operative position to its inoperative position, whenever the threshing machine was transported from one place to another. To overcome these and other difficulties I have invented a novel form of conveyers which is comprised of two sections hinged together, an inner section and an outer section. The inner section is connected for support with the frame of the band cutter and feeder, and the outer section is normally held and supported in alinement with the inner section. During this, their operative position, one section is a continuation of the other. I have provided operative connections between the supporting frame and the two sections whereby the outer section may be swung from its operative position into a folded position underneath the inner section. These operative connections are readily controllable by hand and but little work and time is required to thus fold the conveyer whenever this has to be done—as for instance, for transportation. These and other advantages of my folding conveyer will be readily understood from a detailed description of the drawings which form part of this specification and which illustrate one embodiment of my invention.

In these drawings Figure 1 is a side view of a portion of a band cutter and feeder having attached thereto my novel form of conveyer, the sections of the conveyer being shown in folded position; and Fig. 2 shows a front view of the arrangement of Fig. 1, one of the conveyers being shown in folded position, and the other conveyer being shown in extended position, the dotted lines indicating the position of the outer section as it is about to be swung up into folded position.

The frame 1 is, for the sake of illustration, shown as forming a part of a band cutter or feeder which may be detachably connected with a threshing machine by means of the posts 2. Extending forwardly of the frame are two side members 3 and 4. To each of these side members is secured a plate 5 provided with an upright casing 6. In the particular arrangement illustrated in the drawings, I have shown two conveyers each supported upon one of the casings 6. Since the two conveyers and their associated supporting and folding mechanisms are duplicates of each other, a description of one of the conveyers and its associated supporting and folding mechanism will be sufficient for both. I will here state that the particular means which I have shown for supporting the conveyers on each side of the main conveyer 7, so as to swing in a horizontal as well as a vertical plane, does not in and of itself form part of my present invention, said means being the subject matter of an application, Serial Number 399,144, filed October 25, 1907, by one John T. Hume. Into the casing 6 passes the power shaft 8 which is within the casing, provided with a beveled gear (not shown). Upon the casing 6 is rotatably mounted the cylindrical bearing member 9, in which is journaled the horizontal shaft 10. This shaft, like the shaft 8, is provided with a beveled gear (not shown) which is operatively connected with the gear on the shaft 8 by a pair of beveled gears rigidly secured to the ends of a vertical stub shaft arranged within the casings 8 and 9, as shown in detail in the above mentioned application of John T. Hume. I have not thought it necessary to illustrate this arrangement since it is readily understood from the above description, and since it furthermore does not in and of itself constitute any part of my invention.

Upon the horizontal shaft 10 is pivotally mounted the bracket 11, secured to the rear end of the inner section 12 of my new form of conveyer. Rigidly mounted upon the shaft 10 so as to rotate therewith, is a sprocket 13, as indicated in Fig. 2. Hinged to the inner section at the point 14 is the outer section 15 of the conveyer. This outer section is at its free end provided with a sprocket 16. A sprocket chain 17 passes around the sprockets 13 and 16 and is provided with the usual spurs 18 for advancing the material, such as sheaves of grain, through the auxiliary conveyer to the main conveyer 7. This main conveyer, as indicated in Fig. 2, is mounted centrally of the frame and is adapted to be operated by any suitable mechanism to feed the material into the threshing machine. Inasmuch as this main conveyer and the driving mechanism therefor do not in and of themselves form any part of my present invention, I have not thought it necessary to show the details of such main conveyer and its driving mechanism. The above mentioned application of John T. Hume shows a suitable form of main conveyer and driving mechanism that may be used in connection with the arrangement I have illustrated in Fig. 2.

It will be observed that the two sections of my conveyer are trough-shaped, and are preferably constructed of sheet metal. To aid in guiding the sprocket chain 17 centrally through the sections of the conveyer, the latter may on the interior be provided with upright flanges 19 between which the chain runs. When the sections are in extended or operative position, as indicated at the right of Fig. 2, the rotation of shaft 8 will result in the movement of the sprocket chain 17 in a direction toward the main conveyer so that the material fed into the trough-shaped conveyer will be delivered upon the main conveyer. There is sufficient slack in the chain to permit the sections to be folded as indicated in Fig. 1. In order to prevent displacement of the outer run of the chain when the sections are in folded position, a bracket 20 is provided at the point of connection of the sections to hold the chain in place, as clearly indicated in Fig. 1.

I come now to the description of the mechanism for folding and unfolding the conveyer sections. A lever 21 is pivoted at one end to each side of the upper section at a point substantially mid-way between the ends of the section. These levers 21 are preferably connected together at their upper ends by a cross car 21$^a$. For convenience of manufacture the cross bar and the levers may be formed of a single bar bent into U shaped form, as shown at the left of Fig. 2. Links 22 are pivoted at one end to the sides of the outer or swinging sections 15, and are at the other end connected with the levers 21 by means of links 23. In the particular connection shown in the drawings, the links 23 are not directly connected with the links 22, but are connected with them through the short rods 24 which are at one end pivoted to the links 23 and at the other end to the links 22. However, the presence of these auxiliary rods 24 is not necessary.

A cable, rope or chain 25 is at one end connected to the cross bar 21$^a$ in any suitable way, as by means of a hook 26, and is at its other end wound upon the drum 27 which is rotatably mounted in the bracket 28 fixed to the frame 1. A guide tube 29, which is supported on the frame, serves to guide the cable from the drum 27 to the connecting bar 21$^a$ of the levers 21. The upper end 30 of this guide tube is fork-shaped and carries the roller 31, over which the cable runs. Braces 32 and 33 secured at one end to the frame of the band cutter and at the other end to the tube 29, prevent the latter from rotating in its socket 34. In order, however, to permit a horizontal swinging of the conveyer sections without displacing the cable from the roller 31, the upper end 30 of the guide tube 29 is in the form of a sleeve swiveled upon the tube, so as to adjust itself when the conveyer is swung in a horizontal plane. This adjusted position of the swivel head 30 is clearly indicated in Fig. 2. Accidental displacement of the cable is prevented by the yoke-shaped member 35 which is loosely mounted on the shaft of the pulley. At its outer end this yoke-shaped member is provided with an opening through which the cable passes. In this way, the conveyer sections may be freely swung in a horizontal plane without incurring any danger of the cable slipping from the pulley 31.

Any suitable means may be provided for operating the drum 27. In the drawings I have shown the drum as capable of being operated by means of the hand wheel 36 through the worm 37 and the gear wheel 38, the latter being secured to the shaft of the drum.

The operation of the above described mechanism for folding and unfolding the conveyer sections will now be readily understood, and is as follows: Let it be assumed that the conveyer sections are in their extended position, as indicated in full lines at the right of Fig. 2. In this, the operative position of the conveyer, the cable 25 is held taut on the drum and there is an upward pull on the levers 21. The connecting links and levers 23, 24 and 22 between the levers 21 at one end and the outer conveyer section 15 at the other end, hold the outer section close against the inner section so that the two sections are substantially in alinement to form each a continuation of the other. Suppose it is now desired to fold the conveyer sections into the position in which they are shown in Fig. 1. This is readily done by first bringing the hook 39 into engagement with the inner section so as to hold the same in a substantially horizontal position. The hook 39 is at one end pivotally connected to the guide tube 29 so that it may be readily brought into and out of engagement with the inner section 12. A slot is provided in the bottom of the inner section so that the hook 39 may extend through the section and positively engage the strengthening rib 40 which is secured to the outer surface of the section. The inner section being thus supported by the hook 39, the cable is unwound from the drum until the outer section 15 has swung to the position indicated in dotted lines in Fig. 2. It should here be noted that the outer section 15 and the links 22 constitute a toggle joint having its pivotal point at 41. The pivotal point for the outer section during the folding and unfolding operation is at 14. This point 14 remains substantially stationary during the period of folding and unfolding. In the particular arrangement of levers shown in the drawings, the effective pivotal point of connection between the levers 22 and the levers 21 is at 42. When the parts have reached the position indicated by the dotted lines in Fig. 2, due to the momentum of the swinging section, it will be observed that the pivot 14 for the outer section is to the right of a line joining the pivotal points 41 and 42. When, therefore, an upward pull is exerted on the link 23, as by winding up the cable, the outer section 15 will swing upwardly about the pivot 14 until it is in a substantially horizontal position underneath the inner section 12. When the outer section has reached the limit of its movement, the drum is secured against rotation in the reverse direction and the parts will remain supported in the position in which they are shown in Fig. 1. It will be observed from Fig. 1 that when the conveyer sections are in folded position the levers 21 and links 22 are substantially parallel. This parallelism is brought about by having the links 23 engage lugs 43 secured to the sides of the inner section 12. These lugs compel the links 23 to move in such a direction as to bring the links 22 into substantial parallelism to the levers 21 when the outer section 15 has reached its folded position. In order to swing the outer section from folded position to extended position, the cable is again unwound until the outer section has, by virtue of its momentum, swung to a position somewhat beyond that shown in dotted lines in Fig. 2, so as to bring the movable pivots 41 and 42 in a line to the right (as viewed in Fig. 2) of the stationary pivot 14. With the parts in this position it is obvious that the winding up of the cable will raise the outer section until it is in alinement with the inner section. It will be apparent that the outer section when moved from one point to another swings about its pivot in the manner of a pendulum and that the momentum required during the swing will carry the section beyond the point at which its center of gravity is directly below the pivot 14. If the section be swung downwardly from extended position, the momentum will carry the section to a point at which the link 22 is at the left (as viewed in Fig. 2) of the pivot 14. On the other hand, when the section is swung from folded position the momentum will carry the section to a point at which the link 22 is to the right (as viewed in Fig. 2) of the pivot 14. Therefore, in the first instance, the winding up of the cable at the proper moment will fold the swinging section; while in the second instance, the winding up of the cable at the proper moment will extend the swinging section.

It will be apparent from the above description that all that the operator has to do to swing the outer section of the conveyer from folded to unfolded position and vice versa, is to first unwind the cable until the outer section has swung down to a substantially vertical position and then wind up the cable until the outer section has been brought to a horizontal position either underneath the inner section or in alinement therewith. After the sections have been brought into alined or extended position, as shown in Fig. 2, the supporting hook 39 is removed from the inner section and the conveyer may then be adjusted to the proper angle from the horizontal to receive the sheaves of grain or other material that is to be fed to the main conveyer 7.

While I have described and illustrated a particular form of mechanism for folding and unfolding the conveyer sections, I will have it understood that I do not intend to be limited to such particular form, but that changes and modifications may be resorted to without departing from the scope of the invention as described in the appended claims.

Having thus described my invention what I claim as new and desire to secure by Letters Patent of the United States is:

1. In a device of the class described, the combination of a conveyer comprising an inner section and an outer section hinged together, a frame, means for pivotally connecting the inner section with said frame, a lever pivoted at one end to each side of the inner section, said levers being connected together at the other end, a link pivoted to each side of the outer section, a bar connecting the levers and links on the same side of the sections, mechanism connected with said levers for holding the two sections in alinement, said mechanism being adjustable to lower said levers until the outer section swings under the inner section, so that the raising of said levers will continue to swing the outer section upwardly into folding position underneath the inner section, and stops provided on said inner section for guiding said bars to hold the levers and links substantially parallel when the sections are in folded position.

2. In a device of the class described, the combination of a conveyer comprising an inner section and an outer section hinged together, a frame, means for pivotally connecting the inner section with said frame, a lever pivoted at one end to each side of the inner section, said levers being connected together at the other end, connecting rods pivoted at one end to said levers and at the other end to the sides of the outer section, so that said connecting rods and said outer section form a toggle joint, and mechanism for operating said levers to shift the pivot of said toggle joint from one side to the other of a line connecting the pivotal point of said rods and levers with the pivotal point of the sections, whereby the lowering and raising of said levers swings the outer section out of alinement with the inner section either into folded position underneath said inner section or out of folded position into alinement with said inner section.

3. In a device of the class described, the combination of a conveyer comprising an inner section and an outer section hinged together, a frame, means for pivotally connecting the inner section with said frame, connecting rods pivoted at one end to the sides of said outer section, so that the said rods and outer section form a toggle joint, and mechanism pivotally connected with said rods at their other ends to shift the pivot of said toggle joint from one side to the other of a line connecting the pivotal point of said rods and mechanism with the pivotal point of the sections, whereby the lowering and raising of said rods swings the outer section out of alinement with the inner section either in a folded position underneath said inner section or out of folded position into alinement with said inner section.

4. In a device of the class described, the combination of a conveyer comprising an inner section and an outer section hinged together, a frame, means for pivotally connecting the inner section with said frame, a lever pivoted at one end to each side of the inner section, said levers being connected together at the other end, connecting rods pivoted at one end to said levers and at the other end to the sides of the outer section, so that said connecting rods and said outer section form a toggle joint, mechanism for operating said levers to shift the pivot of said toggle joint from one side to the other of a line connecting the pivotal point of said rods and levers with the pivotal point of the sections, whereby the lowering and raising of said levers swings the outer section out of alinement with the inner section either into folded position underneath said inner section or out of folded position into alinement with said inner section, said mechanism including a drum secured to said frame, a cable wound at one end upon said drum and at its other end connected to said levers, and means for rotating said drum.

5. In a device of the class described, the combination of a conveyer comprising an inner section and an outer section hinged together, a frame, means for connecting the inner section with said frame, mechanism for holding the outer section in alinement with the inner section, said mechanism including readily adjustable toggle levers for folding and supporting the outer section underneath the inner section, and stops adapted to engage said levers and hold them in a predetermined position, when the sections are folded.

6. In a device of the class described, the combination of a conveyer comprising an inner section and an outer section hinged together, a frame, means for connecting the inner section with said frame, a lever pivoted at one end to each side of the inner section, said levers being connected together at the other end, connecting links pivoted at one end to said levers and at the other end to the sides of the outer section, and a rope or cable connected at one end with said levers for operating the same to hold the outer section either in alinement with the inner section or in folded position underneath the inner section.

7. In a device of the class described, the combination of a conveyer comprising an inner section and an outer section hinged together, a frame, means for pivotally connecting the inner section with said frame, a lever pivoted at one end to each side of the inner section, said levers being connected together at the other end, connecting rods pivoted at one end to said levers and at the other end to the sides of the outer section, so that said connecting rods and said outer section form a toggle joint, a drum mounted on said frame, a cable connected at one end with said levers and at the other end wound upon said drum, a guide member carried by said drum for holding the cable in proper relation between the drum and the levers, means for rotating said drum to shift the pivot of said toggle joint, from one side to the other of a line connecting the pivotal point of said rods and levers with the pivotal point of the sections, whereby the lowering and raising of said levers swings the outer section out of alinement with the inner section either into folding position underneath said inner section or out of folded position into alinement with said inner section.

8. In a device of the class described, the combination of a conveyer comprising an inner section and an outer section hinged together, a frame, means for pivotally connecting the inner section with said frame, mechanism for holding the outer section in alinement with the inner section, said mechanism including readily adjustable toggle levers for holding and supporting the outer section underneath the inner section, stops to engage said levers and hold them in a predetermined position when the sections are folded, and means independent of said mechanism for holding the inner section in a substantially horizontal position during the folding and unfolding operation.

9. In a device of the class described, the combination of a conveyer comprising an inner section and an outer section hinged together, a frame, means for pivotally connecting the inner section with said frame, a lever pivoted at one end to each side of the inner section, said levers being connected together at the other end, connecting rods pivoted at one end to said levers and at the other end to the sides of the outer section, so that said connecting rods and said outer section form a toggle joint, mechanism for operating said levers to shift the pivot of said toggle joint from one side to the other of a line connecting the pivotal point of said rods and levers with the pivotal point of the sections, whereby the lowering and raising of said levers swings the outer section out of alinement with the inner section either into folded position underneath said inner section or out of folded position into alinement with said inner section and means independent of said mechanism for holding the inner section in a substantially horizontal position during the folding and unfolding operation.

10. In a device of the class described, the combination of a frame, an inner conveyer section pivoted at one end to said frame so as to swing in a vertical plane, an outer section hinged to said inner section, a lever pivoted at its lower end to each side of the inner section, link connections between said levers and the outer section to hold the latter in alinement with the inner section, and a rope or cable connected to the upper end of said levers for holding the same against the weight of the outer section.

11. In a device of the class described, the combination of a frame, an inner conveyer section pivoted at one end to said frame so as to swing in a vertical plane, an outer section hinged to said inner section, a lever pivoted at its lower end to each side of the inner section, link connections between said levers and the outer section to hold the latter in alinement with the inner section, and a rope or cable connected to the upper end of said levers for holding the same against the weight of the outer section, said cable and link connections being adjustable to release the outer section and to cause the same to be folded and supported under the inner section.

12. In a device of the class described, the combination of a frame, an inner conveyer section, means for supporting said section horizontally on said frame, an outer conveyer section hinged to said inner section, and mechanism for drawing said outer section upwardly underneath said inner section and firmly supporting it in such position, said mechanism including a plurality of levers pivotally connected to said sections, a drum secured to said frame, a cable connected at one end with said levers and at the other end with said frame, and means for operating said drum to wind and unwind the cable.

13. In a device of the class described, the combination of a frame-work, a conveyer comprising an inner section and an outer section hinged together, said inner section being at its rear end pivotally connected to said frame-work, and means connected to both of said sections and rigidly holding the outer section either in alinement with the inner section or underneath the same in folded position, said sections being movable to any desired position while thus supported, said mechanism being operable in one direction to release the outer section and allow it to swing downwardly beyond the vertical position, and being operable in the reverse direction to automatically pull the outer section upwardly either into extended or folded position and securely hold it in such position.

14. In a device of the class described, the combination of a frame-work, a conveyer comprising an inner section and an outer section hinged together, said inner section being at its rear end pivotally connected to said frame-work, a toothed chain rotatably supported at the bottom of said sections to advance the material through the conveyer, a bracket carried by the pivot point of said sections to hold the outer run of the chain in place when the sections are moved into folded position, and mechanism connected to both of said sections and rigidly holding the outer section either in alinement with the inner section or underneath the same in folded position, said sections being movable to any desired position while thus supported, said mechanism being operable in one direction to release the outer section and allow it to swing downwardly beyond vertical position, and being operable in the reverse direction to automatically pull the outer section upwardly either into extended or into folded position and there securely hold the same.

15. In a device of the class described, the combination of a frame-work, a conveyer comprising an inner section and an outer section hinged together, means for pivotally connecting one end of the inner section to the frame-work whereby the said section may swing freely in a vertical as well as horizontal direction, means connected to both of said sections for rigidly holding the outer section either in alinement with the inner section or underneath the same in a folded position, said sections being movable to any desired position while thus supported, said means being operable in one direction to release the outer section and allow it to swing downwardly beyond the vertical position, and being operative in the reverse direction to automatically pull the outer section upwardly either into extended or into folded position and thereby securely holding the same in position.

16. In a device of the class described, the combination of a frame-work, a conveyer comprising an inner section and an outer section hinged together, the said inner section being at its rear end pivotally supported upon the frame-work, mechanism connected to both of said sections for rigidly holding the outer section either in alinement with the inner section or underneath the same in folded position, the said sections being movable to any desirable position while thus supported, said mechanism being operable in one direction to release the outer section to permit the same to swing downwardly beyond the position, and being operable in a reverse direction to automatically pull the outer section upwardly either into extended or folded position, the said mechanism being adopted to securely hold the outer section in its adjusted position, and means independent of said mechanism for holding the inner section in substantially horizontal position during the folding and unfolding operation.

17. In a device of the class described, the combination of a frame, a horizontal support extending from one end thereof, a vertical bearing standard carried by said support, a trough-shaped conveyer pivotally connected at its rear end to said standard so as to swing in a vertical as well as horizontal plane, a second conveyer section hinged to the other end of said first section, and mechanism connected to both sections for rigidly holding the outer section either in alinement with the inner section or underneath the same in folded position, said sections being movable to any desired position while thus supported, said mechanism being operable in one direction to release the second section and allow it to swing downwardly beyond vertical position, and being operable in the reverse direction to automatically pull the second section upwardly either into extended or folded position and securely hold it in such position.

18. In a device of the class described, the combination of a frame, a horizontal support extending from one end thereof, a vertical bearing standard carried by said support, a trough-shaped conveyer section pivotally connected at its rear end to said standard so as to swing in a vertical as well as horizontal plane, a second conveyer section hinged to the other end of said first section, and mechanism connected to both sections for rigidly holding the outer section either in alinement with the inner section or underneath the same in folded position, said sections being movable to any desired position while thus supported, said mechanism being operable in one direction to release the second section and allow it to swing downwardly beyond a vertical position, and being operable in the reverse direction to automatically pull the second section upwardly either into extended or folded position and securely hold it in such position, and means independent of said mechanism for holding the first section in substantially horizontal position during the folding and unfolding operation.

19. In a device of the class described, the combination of a conveyer comprising an inner section, and an outer section hinged together, a frame, means for connecting the inner section with said frame so that it may swing horizontally, a lever pivoted at one end to each side of the inner section and extending upward, said levers being connected together at the outer end, connections between said levers and the sides of the outer section, and flexible means connected at one end to the end of said levers for operating the same to hold the two sections either in alinement or in folded position with the outer section underneath the inner section.

20. In a device of the class described, the combination of a conveyer comprising an inner section and an outer section hinged together, a frame to which the rear end of the inner section is connected, a frame-work secured to the inner section and extending upward, connections between said frame-work and the outer section for holding the latter either in alinement with the inner section or in folded position under the same, and flexible means connected at one end to the upper part of said frame-work and at the other end to the conveyer frame to support the sections in any desired position.

HOWARD F. SNYDER.

Witnesses:
EARL B. LAMBERT,
J. R. BOWEN.

Copies of this patent may be obtained for five cents each, by addressing the "Commissioner of Patents, Washington, D. C."